US005722231A

United States Patent [19]

Porte

[11] Patent Number: 5,722,231

[45] Date of Patent: Mar. 3, 1998

[54] TURBOFAN WITH THRUST REVERSAL DOORS NOT SUBMITTED TO BYPASS AIR IN THEIR INACTIVE POSITION

[75] Inventor: Alain Porte, Colomiers, France

[73] Assignee: Aerospatiale Societe Nationale Industrielle, Paris, France

[21] Appl. No.: 690,165

[22] Filed: Jul. 26, 1996

[30] Foreign Application Priority Data

Jul. 26, 1995 [FR] France ........................ 95 09082

[51] Int. Cl.[6] ........................ F02K 3/02

[52] U.S. Cl. ........................ 60/226.2; 60/232; 239/265.29; 244/110 B

[58] Field of Search ........................ 60/226.2, 232; 239/265.29, 265.31, 265.33; 244/110 B

[56] References Cited

U.S. PATENT DOCUMENTS

| | | | |
|---|---|---|---|
| 3,330,115 | 7/1967 | Markowski | 60/232 |
| 3,465,524 | 9/1969 | Wilde et al. | 60/226.2 |
| 3,541,794 | 11/1970 | Johnston et al. | 239/265.29 |
| 3,815,357 | 6/1974 | Brennan | 60/226.2 |
| 4,216,923 | 8/1980 | Harris . | |
| 5,251,435 | 10/1993 | Pauley | 60/226.2 |
| 5,343,696 | 9/1994 | Rohra et al. . | |
| 5,598,701 | 2/1997 | Newton | 60/226.2 |

FOREIGN PATENT DOCUMENTS

| | | | |
|---|---|---|---|
| 40 39 810 C1 | 12/1990 | Germany . | |
| 1250811 | 10/1971 | United Kingdom | 239/265.29 |

*Primary Examiner*—Thomas E. Denion
*Attorney, Agent, or Firm*—Burns, Doane, Swecker & Mathis, LLP

[57] ABSTRACT

A turbofan, preferentially with separated-flows or short nacelle, comprises two thrust reversal doors normally housed in casings formed in the nacelle and located totally outside the inner enclosure of the nacelle. When a thrust reversal effect is sought, the doors are directed in the prolongation of the fan channel, behind the rear end of the nacelle. Thus, the doors are not submitted to the engine bypass air of the jet engine when the aircraft is in flight and the inner enclosure of the nacelle presents neither leak nor discontinuity and may be totally anti-noise treated.

10 Claims, 4 Drawing Sheets

10 22 28 16 30 24 26 20 F1 18 12 14 F2 F2 30 36 24 26 48

10 22 28 16 26 F2 F3 36 34 24 12 F1 14 48 24 34 F2 30 26 20 F3 36

42 44 46 24 18 22 28 26 34 44 32 46 42 24

10
22
28
16
30
24
26
20
F1
18
12
14
F2
48
F2
30
36
24
26

10
22
28
16
26
F2
F3
36
34
24
12
F1
14
48
24
34
F2
30
26
20
F3
36

18
22
28
34
24
32
12

42
44
46
24
18
22
28
26
34
46
42
44
24
32

TURBOFAN WITH THRUST REVERSAL DOORS NOT SUBMITTED TO BYPASS AIR IN THEIR INACTIVE POSITION

TECHNICAL FIELD

This invention relates to a turbofan provided with thrust reversal doors whose inactive position is characterized by an implantation such that the doors are not submitted to bypass air coming from the fan of the jet engine.

Although the invention may be used on all turbofans employed in propelling aircraft, it is advantageously applied to so-called "separated-flow" or "short nacelle" turbofans, in which the core engine of the turbofan extends towards the rear beyond the rear end of the nacelle which limits externally the annular channel in which the bypass air coming from the fan circulates.

STATE OF THE PRIOR ART

In a well-known manner, a turbofan comprises a core engine similar to a turbojet, delivering a stream of hot gas known as "primary flow". A fan, generally placed at the front of this core engine, is mechanically driven by the low pressure turbine of the core engine. The flow of cold air from the fan, called "secondary flow" or "bypass air" is channeled by an annular channel formed between the outer enclosure of the core engine and the inner enclosure of a nacelle placed coaxially around this core engine. This annular channel is also called "fan channel".

There are two types of turbofans, depending on the configuration of their rear part.

Thus, there are so-called "separated-flow" or "short nacelle" turbofans, in which the nozzle forming the rear part of the core engine is prolonged beyond the rear end of the nacelle. In this case, the bypass air from the fan channel remains separated from the primary air from the core engine, at the rear of the turbofan.

There are also so-called "mixed-flow flow" or "long nacelle" turbofans, in which the nacelle is prolonged towards the rear beyond the rear end of the core engine. In this case, the primary air and the bypass air mix before leaving the turbofan.

Like most aircraft engines, turbofans are equipped with means of thrust reversal which are to be activated during landing, once the aircraft's wheels have touched the ground, in order to supplement the mechanical braking due to the brakes attached to these wheels with an aerodynamic braking due to a reversal of the direction of thrust of the turbofans.

There are currently three types of thrust reversal means capable of being used on turbofans.

A first type of thrust reverser relates to swiveling-door reversers. Doors, generally four in number, are cut in the whole thickness of the nacelle, in the part located around the high-pressure compressor of the core engine. These doors may swivel between an inactive flight position, in which they ensure the continuity of the nacelle, and an active position, in which they are oriented according to an approximately radial direction in relation to the longitudinal axis of the jet. In this active position, the thrust reversal doors block the greater part of the fan channel and deflects the bypass air radially towards the exterior, through the apertures formed in the nacelle at the front of the doors, due to the swiveling of said doors. More specifically, the orientation and the form given to the thrust reversal doors enable them, in this active position, to deflect towards the front the bypass air from the fan when it is ejected from the nacelle. This is how the reverse thrust effect is obtained.

This first technique of thrust reversal has numerous advantages, among which particular mention may be made of its great simplicity, good performance over a period of time and the scope for manufacturing the doors in light and inexpensive materials, since they are not submitted to the cold bypass air from the fan.

This technique also has a few disadvantages resulting, for the most part, from the fact that the doors are cut directly in the thickness of the nacelle and thus form a part of said nacelle's inner enclosure, when they are in their inactive position. These disadvantages notably relate to the presence of leaks at the junction between the doors and the nacelle, the existence of aerodynamic disturbances in the fan channel as a result of a less than perfect alignment of the doors in their inactive position, the existence of acoustic loss due to the fact that it is impossible to fabricate the whole of the inner surface of the doors in material treated for this purpose, and the unfavorable action of the bypass air under pressure, tending naturally to open the doors when the turbofan is functioning.

A second known type of thrust reverser relates to the grill reversers. Grills are incorporated in the thickness of the nacelle, over its entire circumference. When the thrust reverser is in its inactive position, these grills are completely covered towards the exterior of the turbofan by an outer enclosure belonging to a sliding part of the nacelle. This rear sliding part also includes an inner enclosure which conceals towards the interior the rear part of the grills. The internal blocking of the front part of the grills is, for its part, carried out by a multitude of doors (for example 16) assembled on articulated rods on the outer enclosure of the core engine.

These grill reversers are directed to their active position by moving the rear sliding part of the nacelle backwards and by swinging the doors backwards. These said doors now block the fan channel, at the rear of the grills, in such a way that the bypass air from the fan is ejected radially outwards through the grills. The special structure of these grills makes them act as deflectors which direct forwards the bypass air thus ejected from the fan channel. This gives the reverse thrust effect.

By virtue of the numerous doors which almost totally block the fan channel, and by virtue of the interchangeability of the grills making it possible to adjust practically at will the direction of the bypass air expelled outside the nacelle, slightly higher performances are achieved with this technique than with the one previously described.

On the other hand, the description given above shows that grill reversers are mechanisms which are considerably more complex than swiveling-door reversers. It follows that they are significantly heavier, more expensive and less reliable than said swiveling-door reversers. Moreover, since the doors are articulated on the outer enclosure of the core engine by connecting rods which cross the fan channel when the jet is functioning normally, the force of the thrust is reduced.

The grill reversers also has all the disadvantages previously indicated for swiveling-door reversers resulting from the fact that, in their inactive position, certain parts of these reversers are incorporated in the inner enclosure of the nacelle. We shall confine ourselves to noting that these disadvantages are slightly lessened here inasmuch as the surface of the inner enclosure of the nacelle forming part of the reverser is less than in the case of swiveling-door reversers.

The third known type of thrust reverser relates to shell reversers. Unlike the two previously mentioned types of reverser, which may be used on both separated-flow and mixed-flow flow turbofans, shell reversers can only be used on mixed-flow flow turbofans. On Turbofans provided with shell reversers, the rear part of the nacelle forms two half-shells which may swivel on a horizontal plane so as to rest against each other at the back of the core engine and the fan channel, like a parachute, in the reverser's active position.

This third technique has the same advantages of simplicity and reliability as the swiveling-door reversers. It is, moreover, the most efficient of the three doors since the thrust reversal effect relates to the bypass air as well as the primary flow. In passing, it may be noted that the fabrication of the rear part of the nacelle in the form of two shell halves makes it possible, if required, to adjust the outlet section of said nacelle.

On the debit side, the increased efficiency resulting from the simultaneous reversal of the primary flow and bypass air is offset by the fact that heavy and costly material must be used in the fabrication of the two shell halves because of the high temperature of the primary flow from the core engine. Moreover, the very principle of this technique makes it unusable on separated-flow turbofans.

In addition, since the two shell halves are placed totally at the back of the turbofan in their active position, the thrust reversal takes place in a zone usually located under the front of the aircraft wing, when the turbofan is suspended on the wing. The secondary jet inflected by the deployed shell halves thus tends to raise the aircraft which then rolls on the runway, thereby reducing the efficiency of the mechanical brakes attached to the wheels. Despite the greater efficiency of the shell reverser when considered in isolation, the overall braking of the aircraft is therefore not really better than that procured by the other two known techniques.

Finally, it must be noted that this third known technique also has all the previously described disadvantages which result from the fact that the inner enclosure of the nacelle is partly formed on the moving structures of the reverser.

DISCLOSURE OF THE INVENTION

The invention principally relates to a turbofan provided with a new type of thrust reverser, not presenting the disadvantages of known reversers, and whose original conception notably makes it possible to place the moving parts of the reverser totally outside the inner enclosure of the nacelle and free from any contact with the bypass air coming from the fan, in the inactive state of the reverser.

The invention also relates to a turbofan provided with a new type of thrust reverser which is designed preferentially to be installed on a separated-flow or short nacelle turbofan, but which may also be installed on a mixed-flow flow or long nacelle turbofan.

In accordance with the invention, these results are obtained by means of a turbofan, comprising:

- a core engine, of given longitudinal axis, including an outer enclosure;
- a nacelle placed coaxially around the engine and including an inner and an outer enclosure;
- a fan driven by the engine and installed in an annular channel formed between the outer enclosure of the engine and the inner enclosure of the nacelle;
- at least two thrust reversal doors, able to occupy an inactive position, in which the doors are retracted in the nacelle, and an active position, in which the doors inflect, towards the exterior of the nacelle and towards the front, at least a part of the air flow circulating in the annular channel; and
- means of controlling the movement of the doors between their active and inactive positions;

characterized in that:

- in their inactive position, the doors are housed in casings formed on the outer enclosure of the nacelle and located totally outside the inner enclosure of the enclosure; and
- in their active position, the doors are placed beyond a rear end of the nacelle.

Because of the fact that the thrust reversal doors are not submitted to the bypass air coming from the fan, any danger of these doors opening in flight, due to the overpressure existing in the secondary channel, is eliminated. Moreover, the inner enclosure of the nacelle may be made without discontinuity, which makes it possible to eliminate leaks and aerodynamic disturbances inherent in all existing thrust reversal techniques. Furthermore, the acoustic characteristics of the jet can be improved, due to the fact that the whole of the inner enclosure of the nacelle may be fabricated in a material chosen for its acoustic attenuation properties.

In a preferential embodiment of the invention, concerning essentially separated flux or short nacelle turbofans, each of the doors comprises an inner edge in circular arc, which approximately hugs the outer enclosure of the engine, in the active position of the door.

Advantageously, each of the doors then comprises an internal deflector placed in the casing in the inactive position of the door. This internal deflector is located on the inner edge in circular arc and oriented towards the front in the active position of the door.

Moreover, each of the doors also comprises, preferentially, an external deflector placed in the casing in the inactive position of the door. This external deflector is located on an outer edge of the door and oriented towards the front in the active position of the door.

In the preferential embodiment of the invention, the turbofan comprises two thrust reversal doors housed in two casings located on the sides of the jet and stretching over most of the semi-circumference of the nacelle. The doors now move between their inactive and their active position in an approximately horizontal direction.

It is important to note that the kinematics of the movement of the doors between their inactive and their active positions may be of any kind and still remain within the scope of the invention. We shall limit ourselves to examples of three types of possible kinematics, materialized by different means of controlling the movement of the doors.

A first kinematics, which corresponds to two successive swiveling movements in opposite direction of the doors in relation to the nacelle, is obtained by means of movement control comprising swiveling liaison means linking each door to the nacelle and at least one actuator inserted between the door and the nacelle.

A second kinematics, in which the movement of the doors combines a translation movement and a rotation movement, is materialized by means of movement control of the doors which comprise translation and swiveling liaison means linking each door to the nacelle as well as to at least one actuator inserted between the door and the nacelle.

The third kinematics corresponds to a more complex trajectory, materialized by means of movement control of the doors which comprise articulated rod means of liaison linking each door to the nacelle as well as at least one actuator inserted between the door and the nacelle.

BRIEF DESCRIPTION OF THE DRAWINGS

There now follows a description, given as a non limitative example, of a preferential embodiment of a turbofan conforming to the invention, with reference to the accompanying drawings, in which.

DETAILED DISCLOSURE OF A PREFERRED EMBODIMENT

Figure 1:
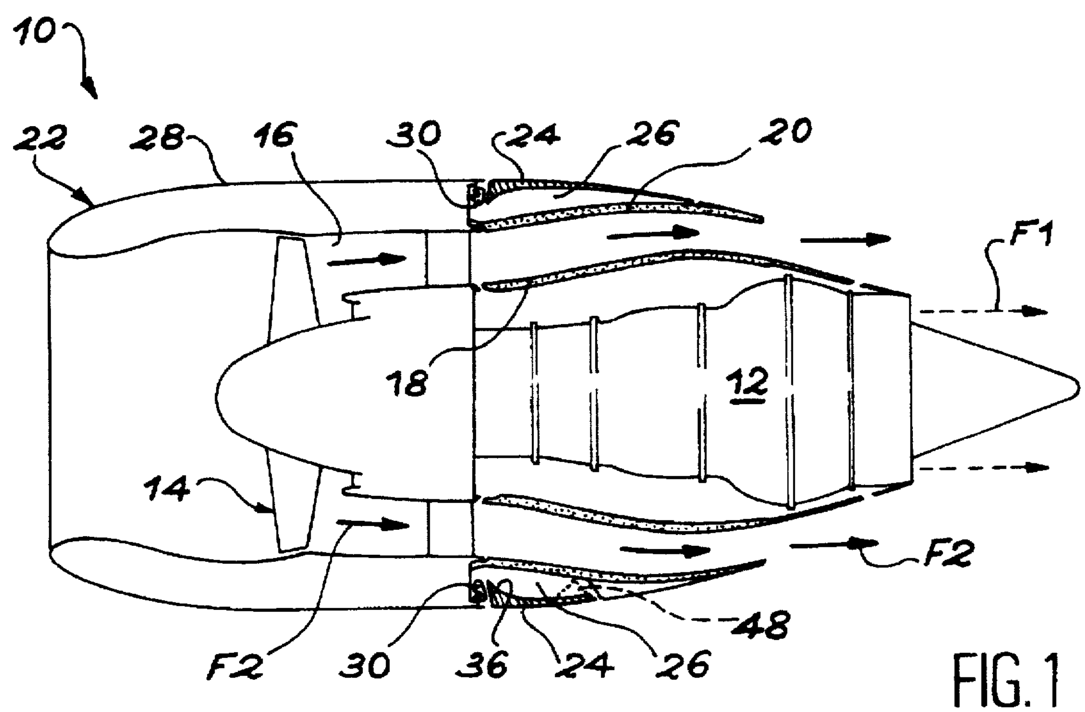
FIG. 1 is a partial longitudinal section view, seen from above, representing schematically a turbofan conforming to the invention, with the thrust reversal doors in the inactive position.
Figure 2:
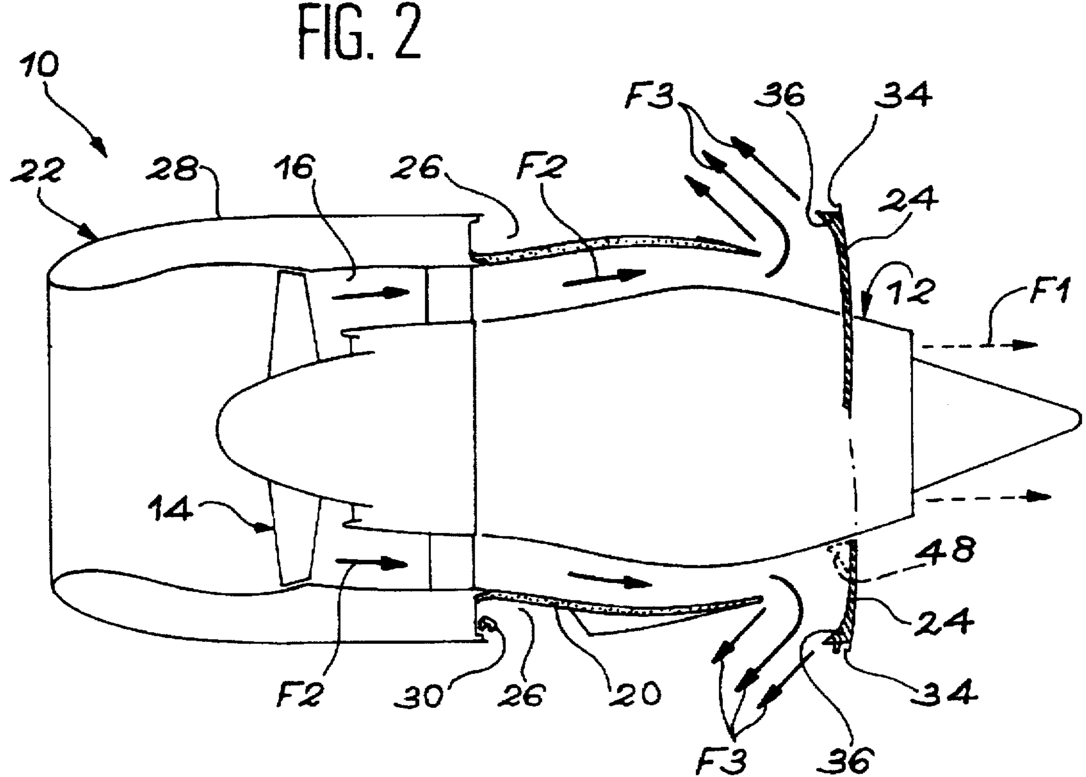
FIG. 2 is a view similar to that of FIG. 1, illustrating the turbofan with the thrust reversal doors in the active position.

FIGS. 1 and 2 show, in very simplified form, a turbofan conforming to the invention. More specifically, the turbofan illustrated in these figures is a separated-flow or short nacelle turbofan.

The general characteristics of such a jet engine are well known and do not form part of the invention. In consequence, we shall briefly recall here only those characteristics necessary to a proper understanding of the invention.

The turbofan, generally designated by reference 10, comprises a core engine 12, of longitudinal axis, whose front end is located on the left when looking at the figures. Starting with this inlet end, the core engine 12 is known to include a compressor, a high-pressure turbine driving the compressor, a combustion chamber and a low-pressure turbine. The low-pressure turbine drives a fan 14 placed at the front of the core engine 12, at the inlet of an annular channel 16, also called "fan channel", located between the outer enclosure 18 of the core engine 12 and the inner enclosure 20 of a nacelle 22 placed coaxially around the core engine 12.

In FIGS. 1 and 2, the arrows F1 and F2 indicate respectively the hot primary flow leaving the core engine 12 and the cold bypass air produced by the fan 14 in the fan channel 16.

In the embodiment showed, which relates to a separated-flow or short nacelle turbofan, the core engine 12 projects towards the rear beyond the rear end of the nacelle 22.

Figure 4:
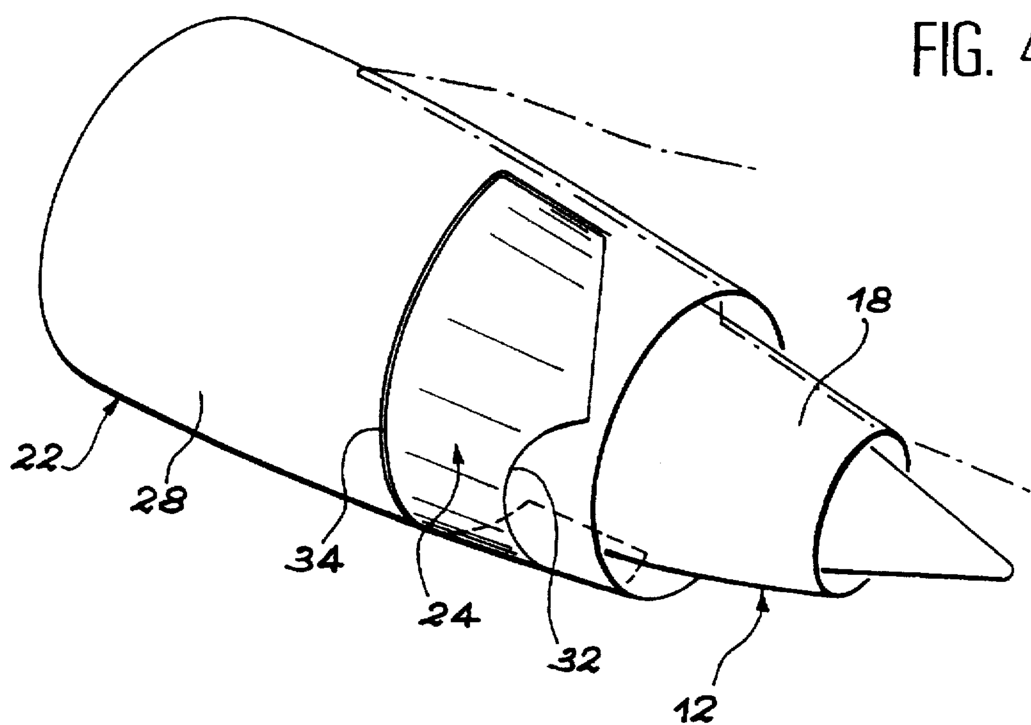
FIG. 4 is a perspective view of the turbofan of FIGS. 1 to 3 representing it with the thrust reversal doors in inactive position.

In accordance with the invention, such a turbofan comprises two thrust reversal doors 24 which are housed in their entirety in casings 26 formed in the outer enclosure 28 of the nacelle 22, when these doors 24 are in their inactive position, illustrated in particular in FIGS. 1 and 4. More specifically, the casings 26 in which the doors 24 are housed are located in their entirety outside the inner enclosure 20 of the nacelle 22, and the doors 24 ensure the continuity of the outer enclosure 28 of the nacelle, in their inactive position.

As is illustrated schematically in FIG. 1, this arrangement of the thrust reversal doors 24, in their inactive position, makes it possible to fabricate the whole of the inner enclosure 20 of the nacelle 22 in a material presenting good acoustic insulation properties. Moreover, no discontinuity is introduced into the fan channel 16, with the result that the flow of the bypass air F2 produced by the fan 14 is not perturbed.

In addition, since the thrust reversal doors 24 are not submitted to any primary flow F1 and bypass air F2 delivered by the jet, the overpressure induced by these flows is not applied on the doors and their accidental opening during flight is virtually impossible. The doors 24 may therefore easily be maintained in their inactive position, as illustrated in FIGS. 1 and 4, by locks of standard design.

Figure 3:
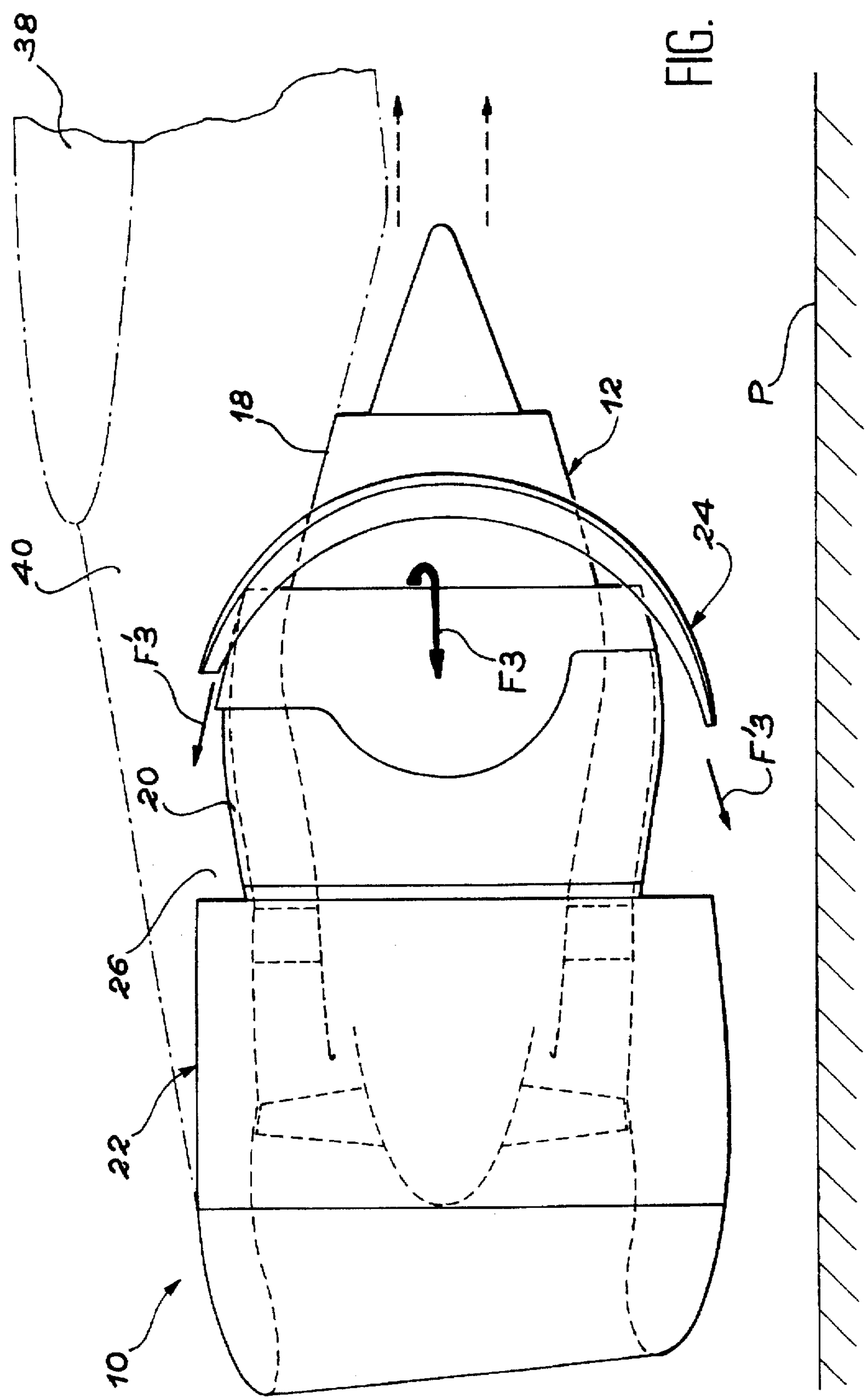
FIG. 3 is a side view, on a larger scale, representing the turbofan of FIGS. 1 and 2 suspended on the wing of an aircraft, with the thrust reversal doors in the active position.
Figure 5:
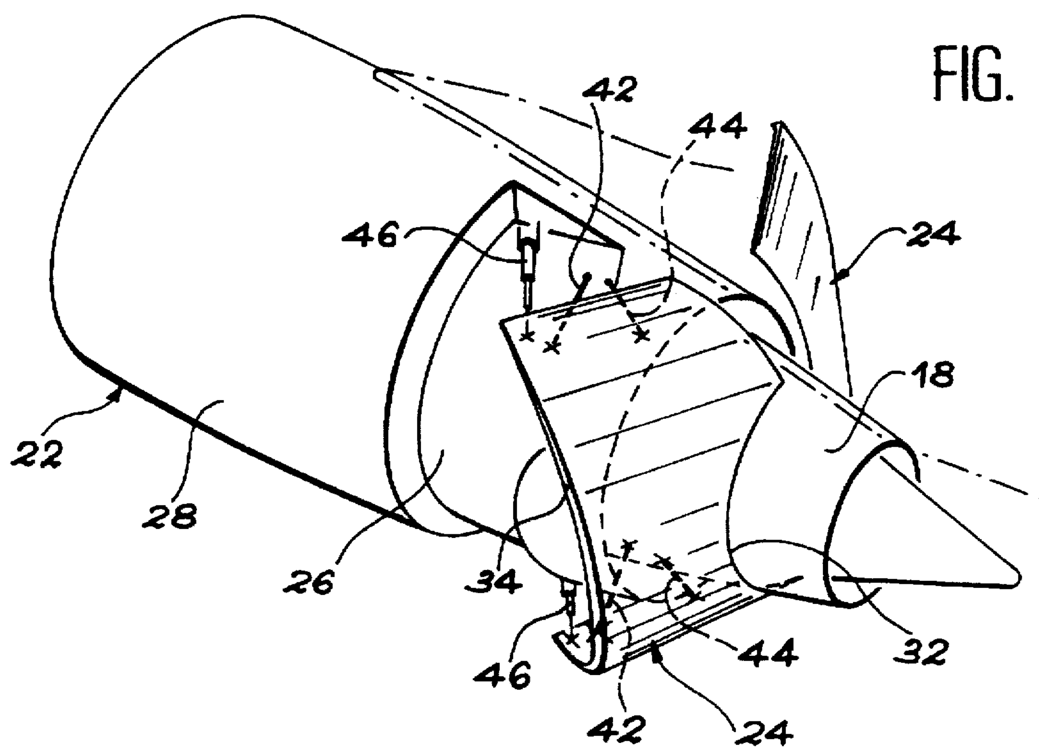
FIG. 5 is a perspective view similar to FIG. 4, representing the turbofan with the thrust reversal doors in active position.

As illustrated particularly in FIGS. 2, 3 and 5, when the two doors 24 are brought to their active position, in which a reverse thrust effect is obtained, they are placed at the rear of the rear end of the nacelle 22, at a sufficient distance to enable the bypass air to flow easily between the doors and the rear of the nacelle. Moreover, the doors 24 are now oriented according to a direction which is approximately radial in relation to the longitudinal axis of the core engine 12, in the projection of the fan channel 16 and outwards beyond this channel. More specifically, the doors 24 are preferentially inclined forwards and outwards (FIG. 5).

As FIG. 5 shows more clearly, each of the doors 24 includes an inner edge 32 in circular arc, which approximately hugs the outer enclosure 18 of the core engine 12, in the active position of this door. When the doors 24 are in their inactive position (FIG. 4), this inner edge 32 in circular arc is oriented towards the rear of the turbofan and gives the cut of the door 24 a complex shape.

The outer edge 34 of each of the doors 24, in the active position of said door, is positioned at the front of the casing 26, perpendicular to the longitudinal axis of the core engine 12 when the doors are in their inactive position.

The casings 26 in which the thrust reversal doors are retracted in their inactive position are positioned on the sides of the turbofan, in symmetrical locations in relation to a center vertical plane of said turbofan. These casings 26 and the doors which they house stretch over most of the corresponding semi-circumference of the nacelle 22. The movement of the doors 24 between their inactive position illustrated in FIGS. 1 and 4 and their active position illustrated in FIGS. 2, 3 and 5 is carried out in an approximately horizontal direction.

It should be noted that in FIGS. 1 and 2, the doors 24 and their casings 26 have been represented sectionally along a center horizontal plane of the turbofan in the lower part and sectionally along a plane passing by the point of the greatest width of the doors in the upper part.

As is represented in 36 in FIGS. 1 and 2, each of the doors 24 includes, on its outer edge 34 (FIGS. 4 and 5) an external deflector 36 which is placed inside the corresponding casing 26 when the door occupies its inactive position. By contrast, when the doors 24 occupy their active position, as illustrated in FIG. 2, the deflectors 36 are oriented towards the front of the turbofan and inflect in that direction the bypass air ejected outside the nacelle 22 by the doors 24. This effect, illustrated by the arrows F3 in FIG. 2, gives the required thrust reversal on the turbofan 10.

As is illustrated in broken lines on the lower parts of FIGS. 1 and 2, each of the doors 24 comprises advantageously on its inner edge 32 in circular arc (FIGS. 4 and 5) an inner deflector 48 which is housed in the corresponding casing 26 when the door is in its inactive position. When the door 24 is in its active position, illustrated in FIG. 2, this inner deflector 48 is oriented towards the front of the jet, in the immediate proximity of the outer enclosure 18 of the core engine 12. This inner deflector 48 improves the flow of bypass air F2 towards the exterior when it hits the doors 24, by very considerably reducing the discontinuities existing at this place between the outer enclosure 18 of the core engine 12 and the doors 24.

It is to be noted that the presence of the deflectors 36 and 48 on the doors 24 is made possible by the fact that the doors 24 are normally housed, in their inactive position, in relatively deep casings 26 of the nacelle 22. This characteristic is due to the fact that the casings 26 are formed in a thick part of the nacelle 22, located around the high-pressure turbine of the core engine 12.

Because of the circular arc curvature of the doors 24 imposed by the fact that these doors complete the outer enclosure 28 of the nacelle 22 in their inactive position, the forward orientation of the bypass air hitting the doors 24 becomes stronger the nearer the upper and lower ends of these doors are approached, as illustrated by the arrows F'3 in FIG. 3. This characteristic allows optimum control of the interaction of the reversed bypass air with the runway P on which the aircraft is running.

It may also be seen from FIG. 3 that, when the doors 24 are in their active position, they are still at the front of the wing 38 on which the turbofan 10 is generally suspended by a stub 40. This characteristic prevents all risk of losing the effectiveness of the aircraft's mechanical brakes by removing virtually all danger of said aircraft lifting off the ground while running on the runway.

FIG. 3 also shows that the arrangement proposed in accordance with the invention for the doors 24 permits these doors to carry out their function of thrust reversal to the full without the need to reduce the dimensions in order to allow for the ground clearance of the aircraft, that is to say for any risk of the doors' interfering with the ground when the thrust reversers are activated.

The movement of the doors 24 between their inactive positions represented in FIGS. 1 and 4 and their active position represented in FIGS. 2, 3 and 5 is carried out through means of movement control which may take different forms easily imaginable to a mechanic without going outside the scope of the invention.

Figure 6:
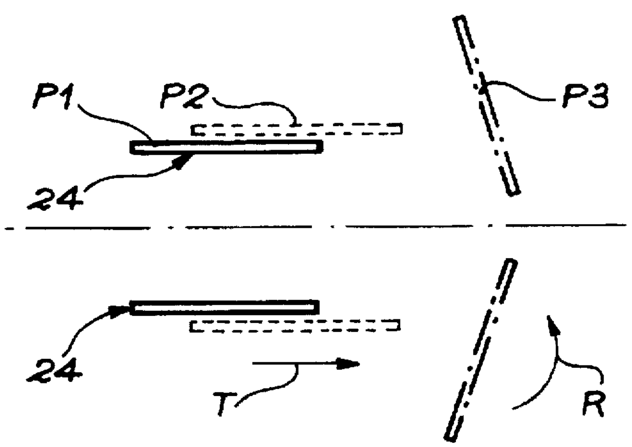
FIG. 6 is a principal section view illustrating very schematically, seen from above, a first possible kinematics of the thrust reversal doors.
Figure 7:
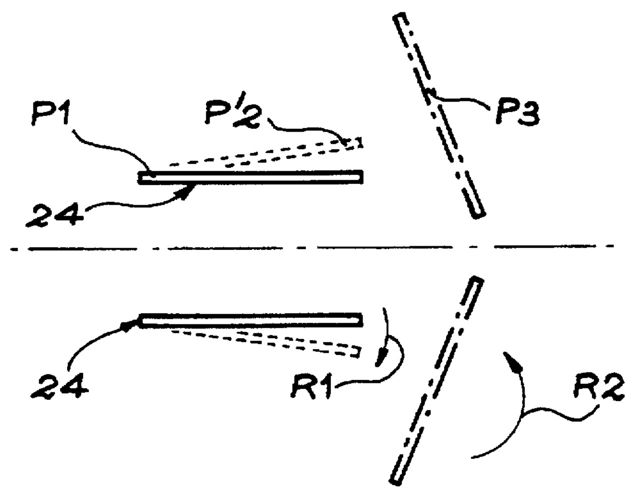
FIG. 7 is a view similar to FIG. 6 illustrating a second possible kinematics of the thrust reversal doors.
Figure 8:
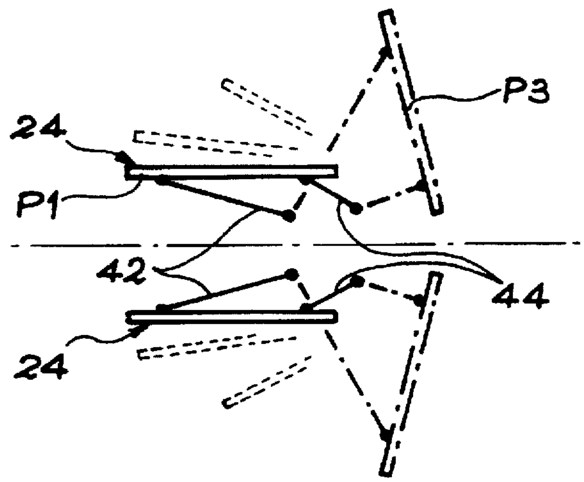
FIG. 8 is a view similar to FIGS. 6 and 7 illustrating a third possible kinematics of the thrust reversal doors.

As an illustration which is in no way limitative, there now follows a description of three embodiments of these means of movement control, through the intermediary of the corresponding kinematics and with reference successively to FIGS. 6 to 8.

As illustrated very schematically in FIG. 6, a first kinematics for switching the doors 24 from their inactive position P1 to their active position P3 consists in first of all subjecting these doors to a translation movement (arrow T) towards the rear of the turbofan (position P2), then a swiveling movement (arrow R) of the doors outwards at angle in the region of 80°. After opening of the locks 30 illustrated schematically in FIGS. 1 and 2, such a kinematics may be controlled, for each door, by means of two actuators (not represented) inserted between the upper and lower ends of the door and the nacelle. The movement itself may be determined by mechanisms comprising slide blocks, stops and swivel pins.

As illustrated very schematically in FIG. 7, a second possible kinematics for switching the doors 24 from their inactive position P1 to their active position P3 comprises a first rotation movement (arrow R1) of the doors around their outer sides 34, now oriented towards the front, allowing the inner sides 32 of the doors to draw apart from the nacelle (position P'2), followed by a second rotation movement (arrow R2), of about 80°, of the doors towards the rear. This second rotation movement is similar to that ending the first kinematics previously described with reference to FIG. 6. Here again, control may be carried out by means of two actuators for each of the doors 24, these said actuators being inserted between the upper and lower ends of the door and the nacelle 22. The combined swiveling movements are carried out by swivel pins in association with mechanical stops.

The third kinematics illustrated schematically in FIG. 8 and, for one of the doors, in FIG. 5, corresponds to a complex movement of the doors, allowing said doors to switch continuously from their inactive position P1 to their active position P2 and vice versa. This kinematics is carried out by means of two pairs of rods 42 and 44 of different lengths whose ends swivel at the top and the bottom of each of the doors 24 and on the nacelle 22. Because of the fact that the rods 42 placed at the front are longer than the rods 44 placed at the rear, the separating of the doors 24, controlled by the actuators 46 arranged in the same way as in the embodiments illustrated in FIGS. 6 and 7, causes the doors to be brought progressively to their active position, without interfering with any other element of the structure of the jet.

Obviously, the invention is not limited to the embodiment which has just been given as an example and includes all variants. In particular, while the invention is especially advantageous in the case of a separated-flow or short nacelle turbofan, it may also be applied to a mixed-flow flow or long nacelle turbofan. In this case, the inactive position of the doors is analogous to that which has been described, whereas, in their active position, the doors are placed entirely at the back of the turbofan, in the manner of a parachute, in order to deflect both the primary flow and the bypass air of the turbofan.

I claim:

1. Turbofan, comprising:

a core engine, of given longitudinal axis, including an outer enclosure;

a nacelle placed coaxially around the engine and including an inner enclosure and an outer enclosure;

a fan driven by the engine and assembled in an annular channel formed between the outer enclosure of the engine and the inner enclosure of the nacelle;

at least two thrust reversal doors, capable of occupying an inactive position, in which the doors are retracted in the nacelle, and an active position, in which the doors inflect at least part of the air flow circulating in the annular channel towards the exterior of the nacelle and forwards; and means of controlling the movement of the doors between their inactive and their active positions;

in which:

in their inactive position, the doors are housed in casings which are formed on the outer enclosure of the nacelle and which are located in their entirety outside the inner enclosure of the nacelle; and in their active position, the doors are placed beyond a rear end of the nacelle.

2. Turbofan according to claim 1, wherein each of the doors comprises an inner edge in semicircular arc, which approximately hugs the outer enclosure of the engine, in the active position of the door.

3. Turbofan according to claim 2, wherein each of the doors comprises an inner deflector placed in the casing in the inactive position of the door, this inner deflector being located on the inner edge in semicircular arc, and oriented towards the front in the active position of the door.

4. Turbofan according to claim 1, wherein each of the doors comprises an outer deflector placed in the casing in the inactive position of the door, this outer deflector being located on an outer edge of the door, and oriented towards the front in the active position of the door.

5. Turbofan according to claim 1, wherein two thrust reversal doors are housed in casings located on the sides of the turbofan and stretch over most of the semi-circumference of the nacelle, the movement of the doors between their inactive position and their active position taking place on an approximately horizontal plane.

6. Turbofan according to claim 1, wherein the means of controlling the movement of the doors comprise means of swivel liaison linking each door to the nacelle, and at least one actuator inserted between the door and the nacelle.

7. Turbofan according to claim 1, wherein the means of controlling the movement of the doors comprise translation and swivel means of liaison linking each door to the nacelle, and at least one actuator inserted between the door and the nacelle.

8. Turbofan according to claim 1, wherein the means of controlling the movement of the doors comprise means of liaison with articulated rods linking each door to the nacelle, and at least one actuator inserted between the door and the nacelle.

9. Turbofan according to claim 1, wherein the doors in their inactive position are separated from the annular channel by the inner enclosure of the nacelle.

10. Turbofan according to claim 1, wherein two thrust reversal doors are housed on opposite sides of the turbofan in the inactive position and the two thrust reversal doors surround most of a circumference of the core engine in the active position.

* * * * *